(12) United States Patent
Chae et al.

(10) Patent No.: US 7,466,370 B2
(45) Date of Patent: Dec. 16, 2008

(54) FLAT PANEL DISPLAY DEVICE WITH CONDUCTIVE BAR AT EDGE OF FIRST DISPLAY PANEL CONNECTED TO PIXEL ELECTRODE PADS ON SECOND DISPLAY PANEL DURING MANUFACTURING

(75) Inventors: Byung-Hoon Chae, Suwon-si (KR); Se-Jun Hoo, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 382 days.

(21) Appl. No.: 11/239,397

(22) Filed: Sep. 30, 2005

(65) Prior Publication Data

US 2006/0082714 A1    Apr. 20, 2006

(30) Foreign Application Priority Data

Oct. 14, 2004    (KR) ............... 10-2004-0082087

(51) Int. Cl.
    *G02F 1/1333* (2006.01)
(52) U.S. Cl. ...................................... 349/40
(58) Field of Classification Search .............. 349/40
    See application file for complete search history.

(56) References Cited

U.S. PATENT DOCUMENTS 5,805,246 A * 9/1998 Lee et al. ............... 349/40
6,839,121 B2 * 1/2005 Kim et al. ............. 349/152
7,154,568 B2 * 12/2006 Kim et al. ............... 349/40

FOREIGN PATENT DOCUMENTS

KR    1998-0014053    5/1998

* cited by examiner

*Primary Examiner*—David C. Nelms
*Assistant Examiner*—John Heyman
(74) *Attorney, Agent, or Firm*—H.C. Park & Associates, PLC

(57) ABSTRACT

A flat panel display device and a substrate therefor capable of preventing a short circuit of pixels due to static electricity is provided. The flat panel display device includes a substrate, a plurality of pixel electrodes, a plurality of pixel electrode pads, a plurality of connection wiring parts, a conductive bar. The pixel electrodes is provided to the substrate. The pixel electrode pads are provided to at least an edge on one side of the substrate to correspond to the respective pixel electrodes. The connection wiring parts connect the pixel electrodes with the corresponding pixel electrode pads and have at least one connection wiring, respectively. The conductive bar is provided on the substrate and positioned on an outer side of the pixel electrode pads to electrically connect the pixel electrode pads. The conductive bar is provided so that a connection of the conductive bar with the pixel electrode pads may be cut off after the manufacturing.

12 Claims, 4 Drawing Sheets

FLAT PANEL DISPLAY DEVICE WITH CONDUCTIVE BAR AT EDGE OF FIRST DISPLAY PANEL CONNECTED TO PIXEL ELECTRODE PADS ON SECOND DISPLAY PANEL DURING MANUFACTURING

CROSS-REFERENCE TO RELATED PATENT APPLICATION

This application claims the benefit of Korean Patent Application No. 10-2004-0082087, filed on Oct. 14, 2004, in the Korean Intellectual Property Office, which is hereby incorporated by reference for all purposes as if fully set forth herein.

BACKGROUND OF THE INVENTION

1. Field of the Invention

The present invention relates to a flat panel display device and a substrate therefor, and more particularly, to a flat panel display device and a substrate therefor capable of preventing a short circuit of pixels caused by static electricity.

2. Description of the Related Art

A flat panel display device is a display device for displaying an image on a flat panel, such as a liquid crystal display (LCD), an organic light emitting display (OLED), or an inorganic light emitting display.

The flat panel display (FPD) device has pixel electrodes of a predetermined pattern provided on a display region, and has electrode pads for providing power to the pixel electrodes prepared on an outer edge of the display region. The respective electrode pads are connected with the pixel electrodes by electrode wirings.

Charged particles accumulate on the pixel electrodes or the electrode wirings due to static electricity generated during a manufacturing process, which is problematic for FPD devices.

In particular, the static electricity problem occurs more severely when the wiring is divided into left and right wiring parts 15a and 15b, as illustrated in FIG. 1.

FIG. 1 and FIG. 2 are schematic views of an organic light emitting display. An icon display part 11, an image display part 12 are provided on a substrate 10. Icon pad parts 13a and 13b and an image pad part 14 coupled with the icon display part 11 and the image display part 12, respectively, and are each provided near an edge portion on one side of the substrate 10.

The icon display part 11 is divided into left and right icon display parts 11a and 11b according to design requirements, and therefore the left and right icon pad parts 13a and 13b are also provided respectively corresponding to the left and right icon display parts 11a and 11b, and the left and right wiring parts 15a and 15b are provided for connecting the left and right icon display parts 11a and 11b with the left and right icon pad parts 13a and 13b.

In the divided left and right structure that is described above and shown in FIG. 1, an insulation film 18 is often damaged due to static electricity generated at a portion where the left and right icon display parts 11a and 11b are adjacent to each other.

For example, as illustrated in FIG. 2, a pixel electrode 16 or a wiring 17 are adjacent to each other provided on a buffer layer 10a of the substrate 10. The pixel electrode 16 is generally made of material having a high work function, such as indium tin oxide (ITO), or another metal oxide, which is a transparent electrode and the wiring 17 is made of transparent electrode material layer 17a and conductive material layer 17b provided on a top surface of the transparent electrode material 17a not facing the substrate 20, such as Cr.

The pixel electrode 16 includes a large amount of positive charges caused by static electricity and the wiring 17 includes a large amount of negative charges on the conductive material layer 17b. These positive and negative charges generate damage B on at least one portion of the insulation film 18 where the pixel electrode 16 and the wiring 17 are provided adjacently to each other. The damaged insulation film 18 results in electrical short-circuiting of a counter electrode 19, the wiring 17, and/or the pixel electrode 16, resulting in malfunction.

SUMMARY OF THE INVENTION

The present invention provides a flat panel display device and a substrate therefor capable of preventing a short-circuit of pixels from being generated due to destruction of an insulation film caused by static electricity that is generated during a manufacturing process.

The present invention discloses a flat panel display device including a substrate, a plurality of pixel electrodes provided on the substrate, a plurality of pixel electrode pads corresponding to respective pixel electrodes and formed on at least a region near an edge of a side of the substrate, a plurality of connection wiring parts having at least one connection wiring for connecting respective pixel electrodes with corresponding pixel electrode pads, and a conductive bar formed on the substrate and positioned on a portion of the substrate that is between the edge and the region near the edge having the pixel electrode pads to couple the pixel electrode pads with each other, wherein coupling of the conductive bar with the pixel electrode pads is cut-off when manufacturing of the flat panel display device is complete.

The present invention discloses a flat panel display device including a substrate, a plurality of pixel electrodes provided on the substrate, a plurality of pixel electrode pads corresponding to respective pixel electrodes and provided on a region near at least an edge of a side of the substrate, a plurality of connection wiring parts having at least one connection wiring connecting the respective pixel electrodes with corresponding pixel electrode pads, and a conductive bar formed on a region near at least an edge of an opposite side of the substrate as the region where the plurality of pixel electrode pads are provided, wherein the conductive bar is not connected with the pixel electrodes, the pixel electrode pads, and the connection wiring parts.

The present invention discloses a substrate for a flat panel display device including a plurality of display parts formed on the substrate, each of the display parts including a plurality of pixel electrodes, a plurality of pixel electrode pads corresponding with respective pixel electrodes, and a plurality of connection wiring parts including at least one connection wiring for connecting the pixel electrodes with corresponding pixel electrode pads, and a plurality of conductive bars provided on at least an edge portion of a side of respective display parts and positioned on an outer side of respective pixel electrode pads to couple the pixel electrode pads of respective display parts with each other, coupling of the conductive bars with the pixel electrode pads is cut-off when manufacturing of the flat panel display device is complete.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The present invention is described more fully below with reference to the accompanying drawings, in which embodiments of the invention are shown.

Figure 1:
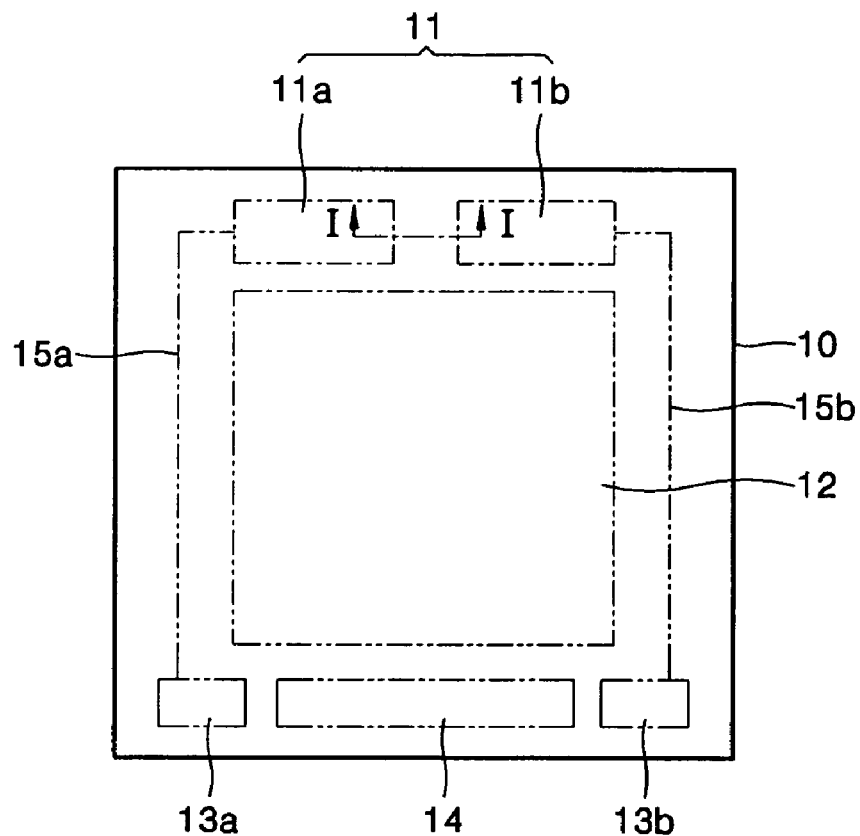
FIG. 1 is a plan view schematically illustrating an example of an organic light emitting display of a related technology.
Figure 2:
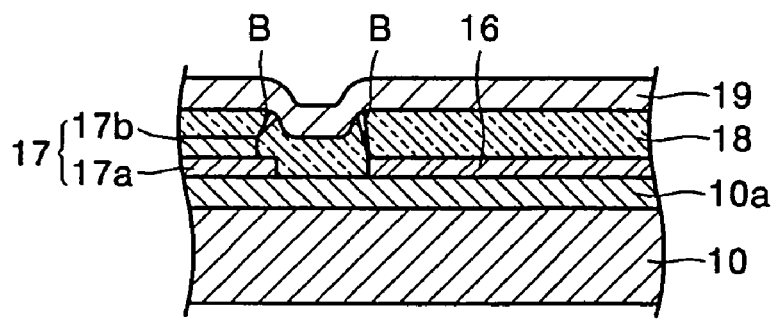
FIG. 2 is a cross-sectional view taken along line I-I of FIG. 2.
Figure 3:
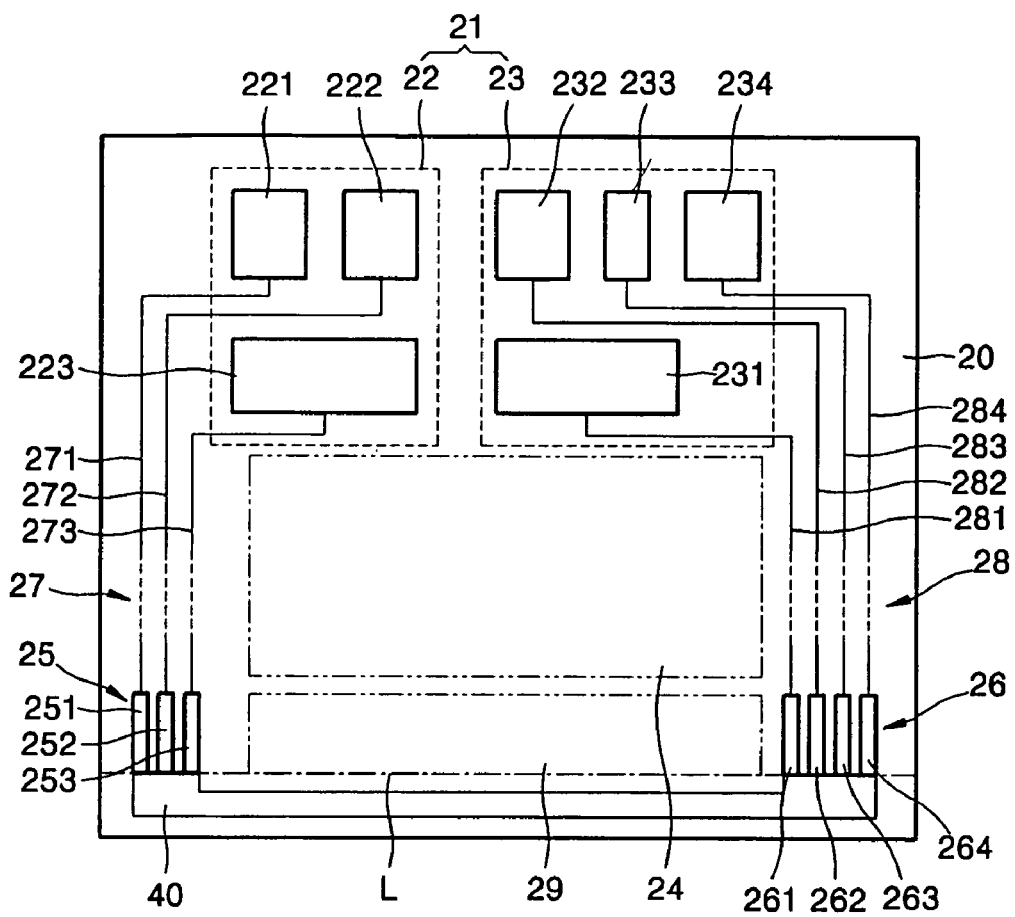
FIG. 3 is a plan view schematically illustrating a flat panel display device according to an embodiment of the invention.

FIG. 3 is a plan view schematically illustrating a flat panel display device according to an embodiment of the invention, in which an organic light emitting display (OLED) is provided on a substrate 20.

An icon display part 21 and an image display part 24 are provided on the substrate 20 at locations determined by design specifications or constraints.

The substrate 20 includes icon pad parts 25 and 26 and an image pad part 29 provided respectively on one side of the substrate 20. A circuit board having a plurality of electronic elements, such as an integrated circuit (IC), is provided, e.g., mounted on the image pad part 29 and the icon pad parts 25 and 26.

The pads parts 25, 26, and 29 may be modified in various ways and are not limited to the above described layout and construction.

Referring to FIG. 3, the icon display part 21 is a region of the substrate 20 where a polarity of icons operate in an ON/OFF manner. The image display part 24 is a region of the substrate 20 for displaying a predetermined image by operating OLEDs arranged in a passive matrix or an active matrix. The image is displayed by the image display part 24 in a general display device. However, the icon display part 21 is provided on a separate, fixed region, where the icon may be displayed.

The image display part 24 has an OLED part of an active matrix type or a passive matrix type arrangement. Any OLED can be used as far as it is a general OLED.

The icon display part 21 and the image display part 24 are sealed or protected by a separate sealing member (not shown) so that there is no contact with an external environment, such as outside air.

According to an embodiment of the present invention, the icon display part 21 is divided into a first icon display part 22 and a second icon display part 23. The icon display parts 22 and 23 are two light-emission regions provided adjacent or next to each other. Further, the icons provided on the respective icon display parts 22 and 23 may be provided in various shapes, which is schematically illustrated in FIG. 3.

Referring to FIG. 3, the first icon display part 22 has a first icon 221, a second icon 222, and a third icon 223 provided and a second icon display part 23 has a fourth icon 231, a fifth icon 232, a sixth icon 233, and a seventh icon 234 provided thereon. The number of the divided sub-icon display parts of the icon display part 21 and the number of the icons of the respective icon display parts 22 and 23 and the shape thereof are not limited to those discussed above and shown in FIG. 3 and may be modified in various ways.

The respective icons of the first icon display part 22 are connected with the first icon pad part 25 via the first connection wiring part 27. For example, the first icon pad part 25 is positioned on a lower end portion of the substrate 20. The respective icons of the second icon display part 23 are connected with the second icon pad part 26 via the second connection wiring part 28. For example, the second icon pad part 26 is positioned on a lower end portion of the substrate 20 that is opposite to the first icon pad part 25. Thus, the first, the second, and the third icons 221, 222, and 223 are coupled with the first, the second, and the third icon pads 251, 252, and 253 of the first icon pad part 25, respectively, by the first, the second, and the third connection wirings 271, 272, and 273. The fourth, the fifth, the sixth, and the seventh icons 231, 232, 233, and 234 are coupled with the fourth, the fifth, the sixth, and the seventh icon pads 261, 262, 263, and 264 of the second icon pad part 26, respectively, by the fourth, the fifth, the sixth, and the seventh connection wirings 281, 282, 283, and 284.

The first and the second connection wiring parts 27 and 28 extend in both directions on an outer side portion of the image display part 24, respectively.

Figure 4:
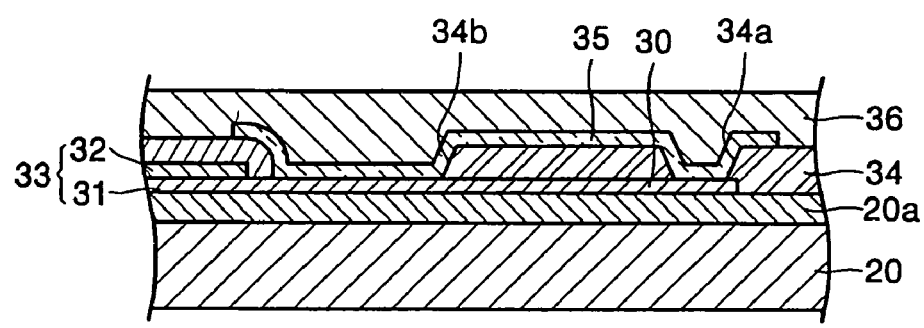
FIG. 4 is a cross-sectional view of one pixel of FIG. 3.

Each icon on the respective icon display parts 22 and 23 forms one pixel. A cross-section of the icon is illustrated in FIG. 4. The cross-section illustrated in FIG. 4 relates to one icon among the icons on the icon display parts 22 and 23, and is representative of all the other icons.

Referring to FIG. 4, a buffer layer 20a is formed on the substrate 20.

For example, the substrate 20 may be made of a transparent glass material, or acryl, polyimide, polycarbonate, polyester, mylar, plastic materials, or metal.

The buffer layer 20a prevents impurity ions from diffusing and may be formed using $SiO_2$ and $SiN_x$. When the substrate 20 is made of plastic material, the buffer layer 20a may be formed as a barrier layer for preventing moisture or outside air from penetrating the substrate 20.

Pixel electrodes 30 are formed in a predetermined pattern on the buffer layer 20a and the pixel electrodes 30 are connected with connection wirings 33. The pixel electrodes 30 are formed so that the respective area of each pixel electrode 30 corresponds with areas of the relevant icons. Further, the pixel electrodes 30 may be formed using transparent electrodes or reflection-type electrodes. When the transparent electrodes are used for the pixel electrodes 30, the transparent electrodes may be made of ITO, IZO, ZnO, or $In_2O_3$. When the reflection-type electrodes are used for the pixel electrodes 30, a reflection film is formed using Ag, Mg, Al, Pt, Pd, Au, Ni, Nd, Ir, Cr, or a combination thereof, and then ITO, IZO, ZnO, or $In_2O_3$ may be formed or provided on the reflection film.

The connection wiring 33 is connected with the pixel electrodes 30. An upper layer 32 of the connection wiring 33 is conductive and may be made of Cr, which has excellent conductivity properties, and may be formed on a lower layer 31 that integrally connected with the pixel electrodes 30 so as to complement a line resistance. It is understood that the connection wiring 33 may be formed as a single layer instead of a multiple layer wiring.

An insulation film 34 is then formed using insulation material, such as organic material including acryl, BCB, polyimide, or inorganic material including silicon oxide, silicon nitride, on an upper portion of the pixel electrodes 30 and the connection wiring 33. The insulation film 34 has predetermined openings 34a and 34b so that a predetermined portion of the pixel electrodes 30 may be exposed. Thus, the insulation film 34 operates as a pixel-define layer. Light emission is generated on portions that correspond to the exposed openings 34a and 34b to display a predetermined icon shape.

An organic film 35 having a light-emission layer is subsequently formed on at least an upper portion of the pixel electrode 30. For example, the light-emission layer of the organic film 35 may have a color that corresponds to a color of the relevant icon.

Counter electrodes 36, which are upper-layer electrodes of an OLED, are formed subsequent to the formation of the organic film 35. Referring to FIG. 3, the counter electrodes 36 may be formed as to cover all of the icons in the icon display part 21, but is not limited to such formation. Instead, the counter electrode may be patterned so that only predetermines icons in the icon display part 21 are covered.

The pixel electrodes 30 and the counter electrodes 36 are insulated from each other by the organic film 35 and the insulation film 34. Voltages of different polarities are applied to the organic film 35 so that light is generated and emitted from the organic film 35.

The pixel electrodes 30 operate as anode electrodes and the counter electrodes 36 operate as cathode electrodes. It is understood that the polarity of the pixel electrodes 30 and the counter electrodes 36 may be reversed.

The counter electrodes 36 may be prepared using transparent electrodes or reflection-type electrodes. Since the counter electrodes 36 are used as cathode electrodes in case the transparent electrodes are used for the counter electrodes 36, metal having low work function, such as Li, Ca, LiF/Ca, LiF/Al, Al, Mg, and compound thereof, is deposited on the substrate in an orientation is that is the same as the orientation of the organic film 35. Auxiliary electrodes or bus electrode lines may subsequently be formed thereon using material for transparent electrode formation, such as ITO, IZO, ZnO, or In2O3. Alternatively, when the reflection-type electrodes are used as the counter electrodes 36, metal material such as Li, Ca, LiF/Ca, LiF/Al, Al, Mg, and compound thereof, is deposited on the substrate so that the electrodes are formed.

The organic film 35 may be either a small molecular or high molecular weight organic layer. When the small molecular organic layer is used for the organic film 35, may be formed by stacking a hole injection layer (HIL), a hole transport layer (HTL), an organic emission layer (EML) and/or an electron transport layer (ETL), an electron injection layer (EIL) in a single structure or a complex structure. For the organic material that can be used in forming the organic film 35, a variety of organic material may be used to form the organic film 35, such as copper phthalocyanine(CuPc), N,N'-Di(naphthalene-1-yl)-N,N'-diphenyl-benzidine (NPB), tris-8-hydroxyquinoline aluminum (Alq3). The small molecular organic layers may be formed by a vacuum deposition technique.

The high molecular weight organic layer may have a structure formed by the HTL and the EML. For example, a polyethylene dioxythiophene (PEDOT) may be used for the HTL, and high molecular weight organic material, such as polyphenylenevinylene (PPV) series and polyfluorene series, may be used for the EML. In addition, the high molecular weight organic layer may be formed by a screen printing technique or an inkjet printing technique method.

Referring to FIG. 3, according to an embodiment of the invention having the above-described structure, a conductive bar 40 is provided to couple the respective icon pads of the first icon pad part 25 and the second icon pad part 26.

The conductive bar 40 couples the respective icon pads of the first icon pad part 25 and the second icon pad part 26 so that all of the icons in the icon display part 21 have an equal electric potential. Therefore, as a result of the conductive bar 40, a potential difference caused by static electricity between the pixel electrodes or the pixel electrode and the connection wiring of the icon display part 21 is resolved and the insulation film is not destructed by a potential difference caused by static electricity.

Referring to FIG. 3, the conductive bar 40 may be positioned at an edge portion of the substrate 20 that is nearer to the edge than the icon pad parts 25 and 26 and the image pad part 29.

The icon pads of the first and the second icon pad parts 25 and 26 are each in an electrically short-circuit state due to the conductive bar 40. Therefore, when manufacturing is complete, the conductive bar 40 should be removed or connection of the conductive bar 40 with the first and the second icon pad parts 25 and 26 should be cut off.

Therefore, the conductive bar 40 should be positioned at an outermost edge of the first and the second icon pad parts 25 and 26 and an outermost edge of the substrate 20 of the image pad part 29, so that it is easier to remove or disconnect. The substrate 20 may subsequently be cut off, e.g., shortened, along a cut line L of FIG. 3 so that the conductive bar 40 is removed. The conductive bar 40 may be cut off or removed using standard manufacturing techniques.

The conductive bar 40 may be formed using the same material as the conductive pattern parts, such as the first and the second icon pad parts 25 and 26 and the image pad part 29, and the manufacturing of the conductive bar 40 may be performed using the same process. Therefore, additional manufacturing processes or materials are not necessary.

Figure 5:
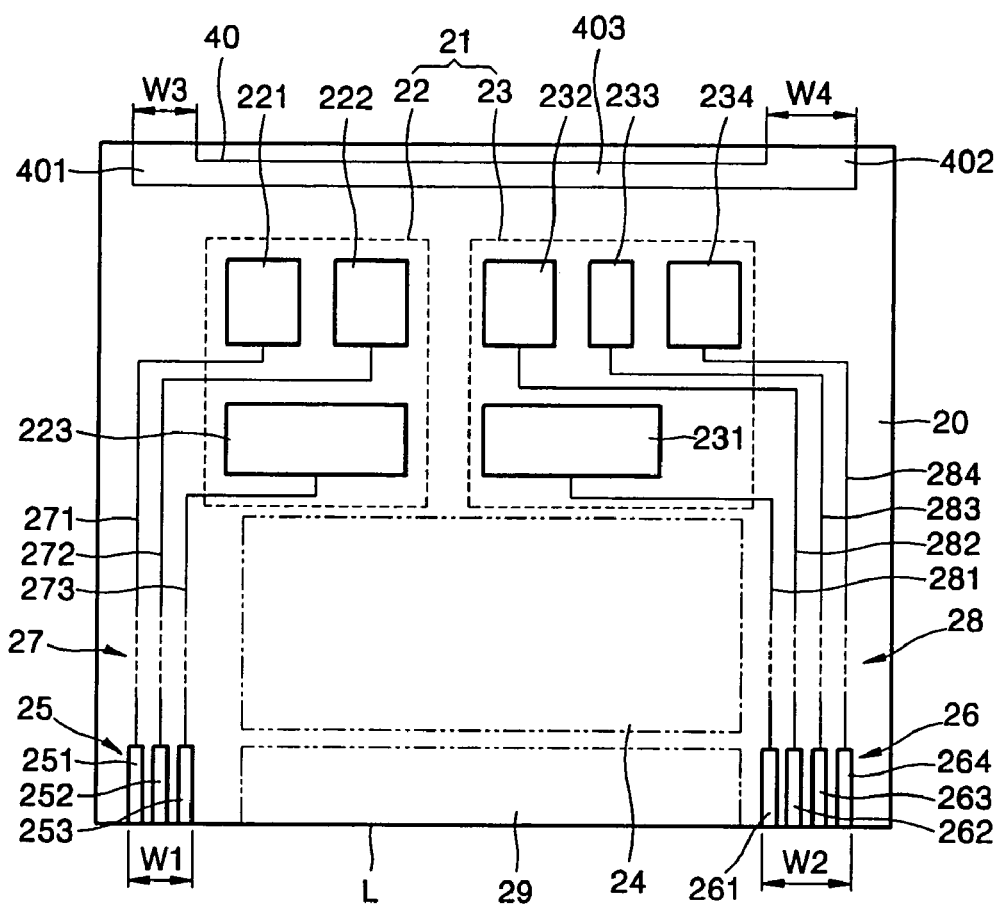
FIG. 5 is a plan view schematically illustrating a flat panel display device according to an embodiment of the invention.
Figure 6:
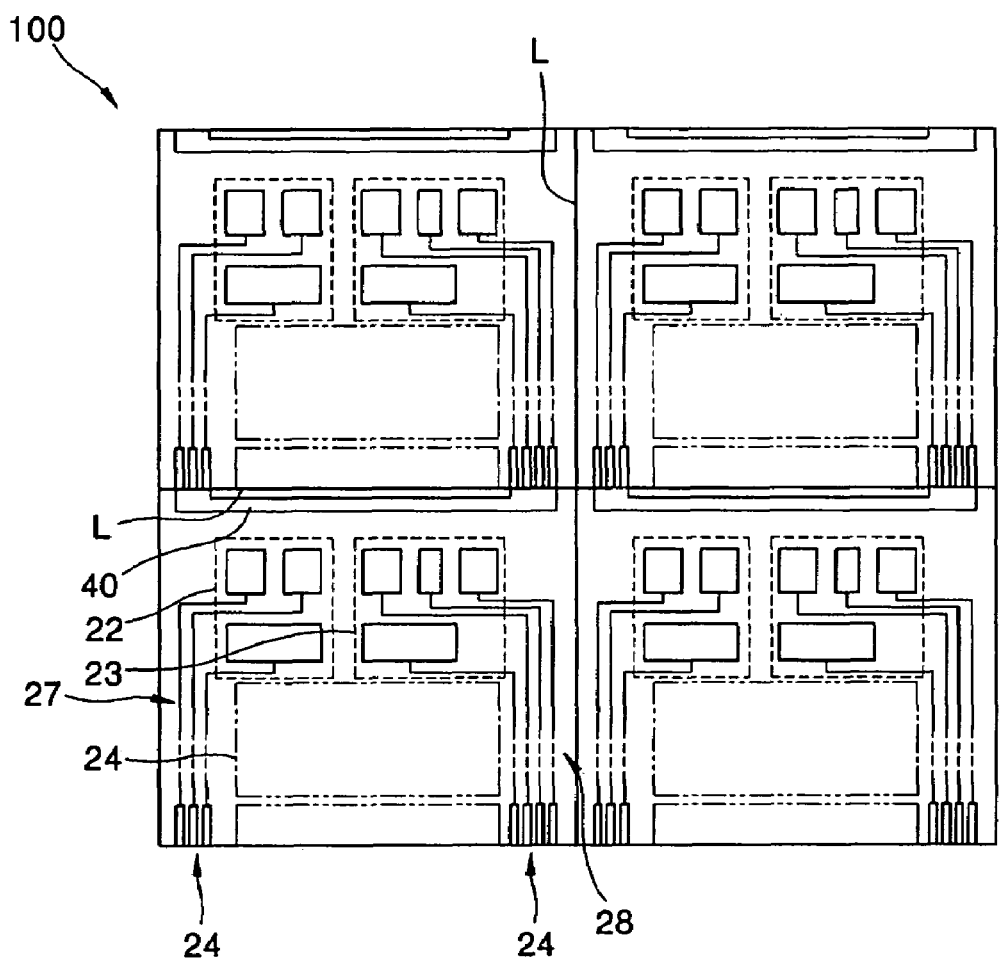
FIG. 6 is a plan view schematically illustrating a substrate for a flat panel display device before the flat panel display device of FIG. 5 is separated.

FIG. 5 is a plan view schematically illustrating a flat panel display device according to another embodiment of the invention. FIG. 6 is a plan view schematically illustrating a substrate for a flat panel display device before the flat panel display device of FIG. 5 is separated.

As shown in the embodiment of FIG. 5, the conductive bar 40 is positioned at an edge on a side of the substrate 20 that is not the same side as the first and second icon pad parts 25 and 26. For example, the conductive bar 40 is positioned on an opposite side of the substrate 20 as the first and second icon pad parts 25 and 26, e.g., facing the first and second icon pad parts 25 and 26.

Referring to FIG. 5 and FIG. 6, the conductive bar 40 removes static electricity of the neighboring flat panel display device before the flat panel display device is removed from the substrate for the flat panel display device. In other words, the conductive bar 40 remains on the substrate 20 after the substrate for the flat panel display device is removed by a cut line L shown in FIG. 6. Therefore, the conductive bar 40 has a first pattern part 401 provided at a position facing the first icon pad part 25 and a second pattern part 402 provided at a position facing the second icon pad part 26. Further, the conductive bar 40 has a connection pattern part 403 for connecting the first pattern part 401 with the second pattern part 402, thereby preventing static electricity.

At this point, a width W3 of the first pattern part 401 is substantially the same as a width W1 of the first icon pad part 25, and a width W4 of the second pattern part 402 is substantially the same as a width W2 of the second icon pad part 26.

As described above with reference to FIG. 6, once the substrate 100 for the flat panel display device is manufactured, the conductive bar 40 removes static electricity and the substrate 100 for the flat panel display device is removed along the cut lines L to manufacture the flat panel display device as illustrated in FIG. 5.

It is understood that applications of the conductive bar 40 are not limited to the above-described icon display part and that the conductive bar 40 may be applied to the image display part 24 in the same manner. Further, the conductive bar 40 may be applied to a variety of display devices, such as a liquid crystal display (LCD) and an inorganic light emitting display device besides the OLED.

The flat panel display device of the present invention can obtain at least the following effects.

The pixel electrodes and the wirings have an equal potential due to the conductive bar, whereby a potential difference caused by static electricity generated during the manufacturing process may be removed.

The potential difference due to the static electricity is removed, whereby destruction of the insulation layer due to the static electricity may be prevented, resulting in there being less malfunction of pixel short-circuit caused by the static electricity.

The conductive bar is easily removed or disconnected after the manufacturing, such that damage caused by the static electricity may be prevented without requiring additional manufacturing process to remove the static electricity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. A first flat panel display device comprising:
   a substrate;
   a plurality of pixel electrodes provided on the substrate;
   a plurality of pixel electrode pads corresponding to respective pixel electrodes and provided on a region near at least an edge of a side of the substrate;
   a plurality of connection wiring parts having at least one connection wiring connecting the respective pixel electrodes with corresponding pixel electrode pads; and
   a conductive bar formed on a region near at least an edge of an opposite side of the first flat panel display device on the substrate as the region where the plurality of pixel electrode pads are provided, wherein the conductive bar is not connected with the pixel electrodes, the pixel electrode pads, and the connection wiring parts, and
   wherein the conductive bar formed on the first flat panel display device is connected with pixel electrodes of a second flat panel display device during manufacturing of the first flat panel display device to couple the pixel electrodes of the second flat panel display device together.

2. The device of claim 1, wherein the pixel electrodes are provided in at least two different neighboring light emission regions, the pixel electrode pads are provided in at least two different pad regions so as to correspond with respective light emission regions, the connection wiring parts are provided in at least two different wiring regions for connecting the respective light emission regions with respective pad regions, and at least two of the wiring regions are spaced apart from each other.

3. The device of claim 2, wherein another light emission region is provided between the spaced wiring regions.

4. The device of claim 2, wherein the conductive bar comprises:
   a first pattern part and a second pattern part, each of the first pattern part and the second pattern part faces a respective different one of the at least two different pad regions that are spaced apart from each other, and
   a connection pattern part connecting the first pattern part with the second pattern part.

5. The device of claim 4, wherein the first and the second pattern parts have the same widths as widths of respective pad regions.

6. The device of claim 1, further comprising:
   an image display part displaying a predetermined image, and
   an icon display part displaying predetermined icons,
   wherein the pixel electrodes are positioned on the icon display part.

7. A substrate for a flat panel display device, comprising:
   a plurality of display parts formed on the substrate, each of the display parts including a plurality of pixel electrodes, a plurality of pixel electrode pads corresponding with respective pixel electrodes, and a plurality of connection wiring parts including at least one connection wiring for connecting the pixel electrodes with corresponding pixel electrode pads; and
   a plurality of conductive bars provided on at least an edge portion of a side of respective display parts and positioned on an outer side of respective pixel electrode pads to couple the pixel electrode pads of respective display parts with each other,
   wherein the coupling of a first conductive bar with the pixel electrode pads of a first respective display parts is cut-off when the flat panel display device comprising the first respective display parts is separated from a second flat panel display device on the substrate, leaving a second conductive bar of the plurality of conductive bars at the edge portion of the flat panel display device coupled to respective display parts of a further flat panel display device.

8. The substrate of claim 7, wherein the pixel electrodes of the respective display parts are provided in at least two different neighboring light emission regions, the pixel electrode pads of the respective display parts are provided in at least two different pad regions so as to correspond with respective light emission regions, the connection wiring parts of the respective display parts are provided in at least two different wiring regions for connecting the respective light emission regions with respective pad regions, and at least two of the wiring regions of the respective display parts are spaced apart from each other.

9. The substrate of claim 8, wherein another light emission region is provided between the spaced wiring regions of the respective display parts.

10. The substrate of claim 8, wherein respective conductive bars couple at least one pad region with another pad region of the respective display parts.

11. The substrate of claim 10, wherein the conductive bar binds respective pixel electrode pads of the pad regions connected with each other by the conductive bar to connect the pixel electrode pads in a single unit.

12. The substrate of claim 7, wherein the respective display parts comprise:
   an image display part displaying a predetermined image; and
   an icon display part displaying predetermined icons,
   wherein the pixel electrodes of the respective display parts are positioned on the icon display part.

* * * * *